No. 651,804. Patented June 12, 1900.
G. L. HOUGHTON.
GLOBE AND FIXTURE THEREFOR.
(Application filed Mar. 23, 1900.)

(No Model.)

Witnesses. Inventor.
George L. Houghton

UNITED STATES PATENT OFFICE.

GEORGE L. HOUGHTON, OF WOODSTOCK, MINNESOTA.

GLOBE AND FIXTURE THEREFOR.

SPECIFICATION forming part of Letters Patent No. 651,804, dated June 12, 1900.

Application filed March 23, 1900. Serial No. 9,858. (No model.)

*To all whom it may concern:*

Be it known that I, GEORGE L. HOUGHTON, a citizen of the United States, residing at Woodstock, in the county of Pipe Stone and State of Minnesota, have invented a new and useful Globe and Fixtures Therefor; and I hereby declare the following to be a full, clear, and exact description of the same.

My invention relates to fixtures for use on both slated and blackboard globes and all globes intended for use by marking lines and figures with chalk or other substance to be erased and also for use on all kinds of terrestrial and celestial globes used in schools, colleges, and by geographers, navigators, and astronomers.

The objects of this invention are to facilitate the teaching of geography, geometry, spherical trigonometry, astronomy, map-drawing, surveying, and all kinds of measurements applicable to the above-named sciences, the ready translation of degrees into miles and the reverse on any circle of the earth, great or small, and in any direction upon the earth's surface, to locate points and geographical features of the earth readily by latitude and longitude, chart coast-lines, trace the routes of ships, &c. I attain these objects by the mechanism illustrated by the accompanying drawings, in which—

Figure 1:
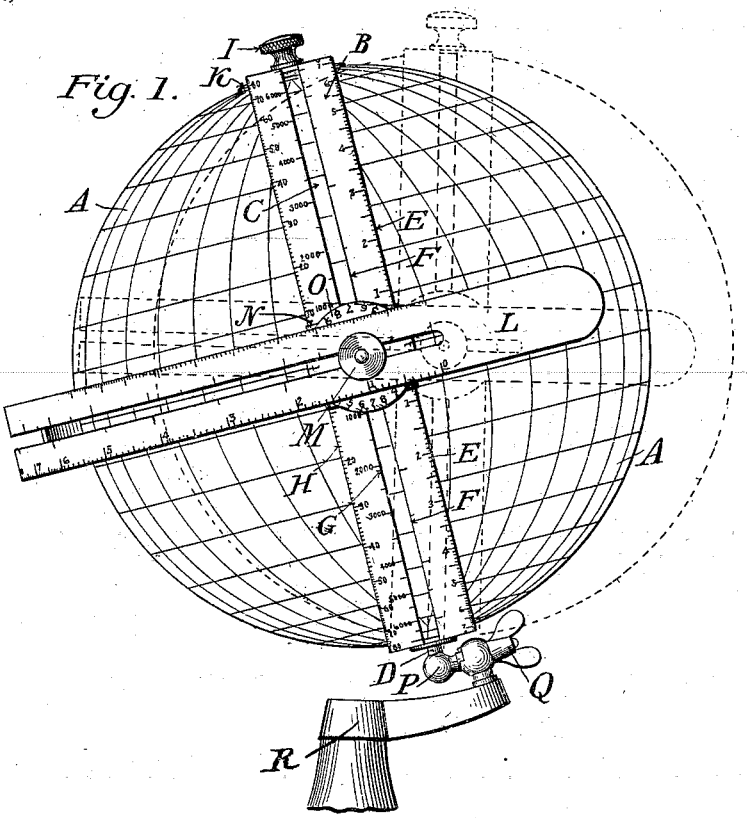
Figure 2:
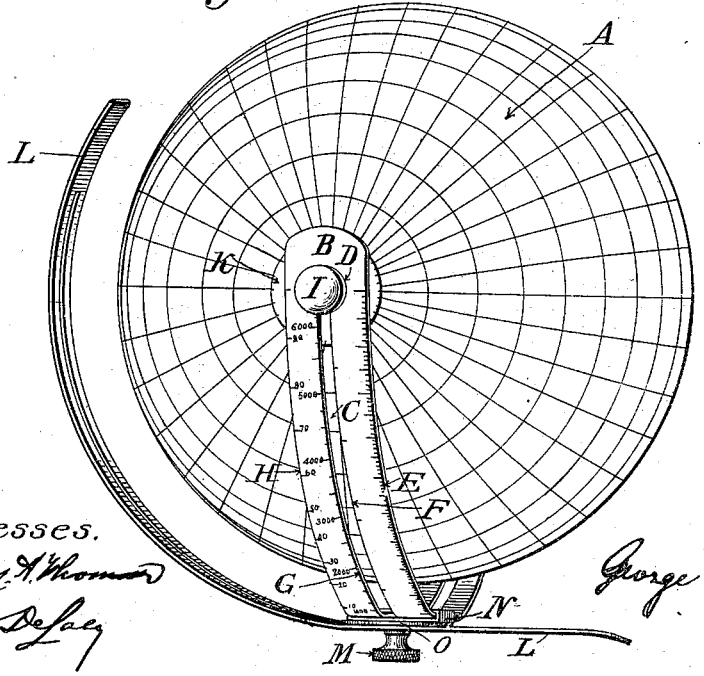

Figure 1 represents the globe with the fixtures in side elevation, and Fig. 2 represents a top plan view of the same.

A represents the globe-ball.

B represents the meridian-circle or half-circle, being flat like a hoop, of thin material, generally of metal—such as brass, copper, iron, steel, or other metal or combinations of metals, or other suitable material—generally from one (1) inch to two (2) inches broad and divided into two sections by a slot or aperture C. The meridian-circle or semicircle is hung on the axis-rod D, so that the globe may revolve within the circle or the circle move around the globe. The right section of the circle has on one margin a rule E, scaled in inches and fractions thereof, as may be desired, the fractions generally being tenths of an inch as the smallest fraction and the even inches numbered from zero (0) at the equator, increasing each way to the poles, respectively, and on the other margin a rule scaled in the metric system, zero (0) at the equator and even meters numbered, increasing each way to the poles, respectively, (shown by F.) The left section of the meridian-circle has on its right margin a scale of miles G corresponding to the size of the globe on the theory that the earth is a sphere eight thousand (8,000) miles in diameter, which may be changed to the more exact figures fixed by astronomers when determined or desired. On the other margin of this section is a rule scaled in degrees of the circle H, with zero (0) at the equator and numbered in even sections, generally five degrees and multiples thereof, increasing from the equator to the ninety-degree mark at the poles, respectively.

The axis-rod of the globe passes through the slot of the meridian-circle at the north pole and may be loosened or tightened with the thumb-nut I, so as to hold the meridian-circle and globe rigidly to the axis when desired. There is a disk, dial, or protractor K at the poles on the globe, divided into numbered sections, as may be desired, generally into sections of fifteen (15°) degrees each, thus marking the hours.

There is a flexible quadrant-rule L, which rule has a slot in the center similar to that in the meridian-circle, through which it is hung on a stem having a thin flat head under the meridian-circle and between it and the surface of the globe. This quadrant-rule slips forth and back on the stem and may be fastened at any point by a thumb-nut M. The stem also passes up through a loop or sleeve N, which slides up and down on the meridian-circle B, and the stem also passes up through the center of a disk, dial, or protractor O, having numbered sections, for describing circles, as may be desired, at any desired angle from any point on the globe, and this disk is fastened to the loop.

The globes may be mounted on stands of any desired pattern. The south pole of the axis fits into a swivel or swing joint P, Fig. 1, and may be fastened with the axis in any angle or position, from horizontal to perpendicular, by tightening the thumb-nut Q, Fig. 1, on the shank of the stand R, Fig. 1.

Having thus described my invention, what I claim as new, and desire to secure by Letters Patent, is—

1. In combination with a globe, a meridian-circle having a longitudinal slot extending from pole to pole of said globe and provided with scales of latitude and distances.

2. In combination with a globe, a flexible quadrant-rule having graduated scales marked thereon.

3. In combination with a globe, a flexible quadrant-rule adjustably mounted thereon.

4. A globe, and in combination therewith a slotted meridian-circle, the globe-axis passing through the slot in said meridian-circle, and a thumb-nut on the end of said axis and adapted to clamp said meridian-circle in variously-adjustable positions.

5. In combination with a globe, a meridian-circle adjustably mounted on the axis of said globe, and a flexible quadrant-rule pivotally and slidably mounted on said meridian-circle.

6. In combination with a globe, a slotted meridian-circle mounted on said globe, a sleeve adjustably mounted on said meridian-circle, a graduated disk mounted on said sleeve, and a quadrant-rule mounted to turn on said disk.

Washington, District of Columbia, March 22, 1900.

GEO. L. HOUGHTON.

Witnesses:
WM. H. DE LACY,
HENRY A. THOMAS.